US009260631B2

(12) United States Patent
Husemann et al.

(10) Patent No.: US 9,260,631 B2
(45) Date of Patent: Feb. 16, 2016

(54) PRESSURE-SENSITIVE ADHESIVE TAPES FOR GLUING WINDOWS, IN PARTICULAR IN MOBILE DEVICES

(75) Inventors: Marc Husemann, Hamburg (DE); Kai Ellringmann, Hamburg (DE); Marco Kupsky, Quickborn (DE); Claus Meyer, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 13/884,098

(22) PCT Filed: Oct. 27, 2011

(86) PCT No.: PCT/EP2011/068830
§ 371 (c)(1),
(2), (4) Date: Jul. 12, 2013

(87) PCT Pub. No.: WO2012/062589
PCT Pub. Date: May 18, 2012

(65) Prior Publication Data
US 2013/0295356 A1   Nov. 7, 2013

(30) Foreign Application Priority Data
Nov. 12, 2010 (DE) .......................... 10 2010 043 881

(51) Int. Cl.
*C09J 7/02* (2006.01)
*C09J 133/02* (2006.01)

(52) U.S. Cl.
CPC .............. *C09J 7/0217* (2013.01); *C09J 7/0246* (2013.01); *C09J 133/02* (2013.01);
(Continued)

(58) Field of Classification Search
USPC ........................ 428/214, 354, 220; 525/329.7
See application file for complete search history.

(56) References Cited

U.S. PATENT DOCUMENTS

| 8,152,944 B2 | 4/2012 | Ellringmann et al. |
| 8,188,194 B2 | 5/2012 | Yoshida et al. |
| 2003/0232192 A1 | 12/2003 | Kishioka et al. |

(Continued)

FOREIGN PATENT DOCUMENTS

| DE | 102006035786 A1 | 3/2008 |
| DE | 102008047965 A1 | 3/2010 |

(Continued)

OTHER PUBLICATIONS

German Search Report for 102010043881.2 dated Jun. 30, 2011.
International Search Report for PCT/EP2011/068830 dated Nov. 6, 2012.

*Primary Examiner* — Tahseen N Khan
(74) *Attorney, Agent, or Firm* — Norris McLaughlin & Marcus PA

(57) ABSTRACT

The invention relates to a double-sided adhesive tape, comprising a carrier layer and two exterior pressure-sensitive adhesive compound layers, wherein at least one of the pressure-sensitive adhesive compounds is the crosslinking product composed of a polymer compound which comprises at least the following components: A) a polymer component (component A) comprising 88 to 100 wt % of one or more polyacrylates (component A1) composed of at least: a) 1 to 15 wt %, relative to component A1, of one or more monomers having at least one ethylenically unsaturated bond, each being selected such that the glass transition temperatures $T_G$ of the corresponding homopolymers composed of the respective monomers are at least 0° C. (monomers a), wherein at least some of the monomers (a) still comprise at least one carboxylic acid (monomers a1), b) 85 to 99 wt %, relative to component A1, of one or more monomers from the group of acrylic acid esters and methacrylic acid esters, each being selected such that the glass transition temperatures $T_G$ of the corresponding homopolymers composed of the respective monomers are not higher than −30° C. (monomers b), B) at least one covalently cross-linking bifunctional or polyfunctional crosslinking agent (component B), wherein components A and B in total amount to at least 95 wt % of the polymer compound, and wherein the at least one crosslinking agent is added in a quantity such that the quantity ratio $V=n_Z/n_P$ of the substance quantity $n_Z$ of the crosslinking-active centers of the crosslinking agent to the theoretical substance quantity $n_P$ of the macromolecule of polymer component A1 has a value between 0.15 and 0.60, wherein the substance quantity $n_Z$ of the crosslinking-active centers of the crosslinking agent is obtained from the mass $m_V$ of the crosslinking agent, multiplied by the number f of crosslinking-active centers per crosslinking agent molecule, divided by the molecular weight $M_V$ of the crosslinking agent, that is, $n_Z=f \cdot m_V/M_V$, and the theoretical substance quantity $n_P$ of the macromolecule of polymer component A1 is obtained from the mass $m_P$ of the polymer component in the pressure-sensitive adhesive compound, divided by the average molecular weight $M_{n,P}$ of said component, that is $n_P=m_P/M_{n,P}$.

14 Claims, 2 Drawing Sheets

(52) U.S. Cl.
CPC ..... *C09J 2201/128* (2013.01); *C09J 2203/318* (2013.01); *C09J 2433/00* (2013.01); *Y10T 428/24959* (2015.01); *Y10T 428/2848* (2015.01)

(56) References Cited

U.S. PATENT DOCUMENTS

| | | | |
|---|---|---|---|
| 2005/0253277 | A1 | 11/2005 | Yamanaka et al. |
| 2008/0118751 | A1* | 5/2008 | Zollner et al. ............... 428/343 |
| 2009/0277562 | A1* | 11/2009 | Ellringmann et al. .......... 156/60 |
| 2010/0209649 | A1* | 8/2010 | Kuwahara et al. ........... 428/41.3 |

FOREIGN PATENT DOCUMENTS

| | | |
|---|---|---|
| DE | 202010001353 U1 | 5/2010 |
| EP | 1520896 A1 | 4/2005 |
| JP | 2000306664 A | 11/2000 |
| JP | 2001345338 A | 12/2001 |
| JP | 2007146170 A | 6/2007 |
| JP | 2009209330 A | 9/2009 |
| JP | 2009270111 A | 11/2009 |
| WO | 2009008470 A1 | 1/2009 |
| WO | 2011000716 A1 | 1/2011 |

* cited by examiner

PRESSURE-SENSITIVE ADHESIVE TAPES FOR GLUING WINDOWS, IN PARTICULAR IN MOBILE DEVICES

This application is a 371 of PCT/EP2011/068830 filed Oct. 27, 2011, which claims priority to the German patent application DE 10 2010 043 881.2 filed Nov. 12, 2010.

The invention relates to a double-sided adhesive tape for the bonding of window units in electronic consumer goods, and also to a polymer composition for producing pressure-sensitive adhesives for an adhesive tape of this kind.

Virtually all devices in modern consumer electronics have visual display systems for display of the operating state of the device, or other information. Where relatively complex relations are to be shown, it is common, for the purpose of display, to use display modules based on liquid crystals (LCDs) or organic light-emitting diodes (OLEDs). Displays of such kinds are employed for instance in digital cameras, portable ultracompact computers, and mobile telephones.

In order to protect the display modules from any damage due to external mechanical exposure, such as impacts, for example such display systems typically have transparent protective windows which cover the outside of the display modules and so reduce the risk of the module suffering direct exposure. Protection of this kind is likewise necessary for nonelectronic visual display systems, such as for mechanical displays such as clocks or level indicators on reservoir vessels, for example.

Protective windows used are typically polymer sheets (made, for example, of polycarbonate (PC) or polymethyl methacrylate (PMMA)) or glass sheets, with each of the two systems having benefits and drawbacks and being selectable accordingly in line with the specific application.

For instance, polymer sheets, while being inexpensive, easy to process, and affording efficient protection with respect to mechanical exposures, have the drawback that they are typically not scratch-resistant and are therefore easily damaged. This not only leads, after a short time, to a deterioration in the esthetic impression of the display systems, but also, furthermore, has the consequence of diminished sight of the display region of the display modules. Moreover, many common polymers have only limited resistance to ultraviolet light (UV light) or organic solvents.

On the other hand, protective windows made of glass are inert toward organic solvents and because of their high hardness are also scratch-resistant, thus giving a high-value impression. Owing to the brittleness of this material, however, which is a result of the hardness, glass is of only limited suitability for protection against mechanical exposures such as impact or collision, since even weak stresses may be accompanied by shattering brittle fracture of the glass sheet. Along with the limited protective effect, therefore, there is a risk of injury from the resultant splinters, and the risk of damage to the display module from sharp-edged fragments.

Protective display windows in the casing—which normally consists of plastic or metal—of electronic devices, especially small portable devices such as mobile telephones and the like, are nowadays fixed primarily by means of double-sided adhesive tapes. These double-sided pressure-sensitive adhesive tapes are generally adapted to the material to be bonded—for the bonding of glasses, for instance, it is usual to use adhesive tapes which exhibit a certain shock absorption behavior and therefore are able to absorb mechanical collisions, whereas for the bonding of plastics (polymer sheets) it is more important to compensate flexural stresses.

The manufacturers of small electronic devices of these kinds have an interest, for reasons of practicability and cost, in being able to use a single adhesive tape, which is then capable of combining equally the positive properties from the different materials hitherto employed.

The objective problem for the skilled person, therefore, was that of offering an adhesive tape which is suitable for the bonding both of glass and of transparent plastics in consumer electronics articles and which at the same time contributes to the protection of these articles from external influences. In particular, advantageously, the intention was to realize compensation of flexural stresses and good shock absorbency. Since mobile devices are sometimes subject to temperature fluctuations and relatively high temperatures, the adhesive tape ought preferably, furthermore, to possess a high temperature cohesion stability.

It has surprisingly been found that an adhesive tape based on acrylate copolymers exhibits the desired suitability when a particular crosslinking state is realized and when the resin fraction is limited. The subject matter of the first claim therefore relates to a double-sided pressure-sensitive adhesive tape, comprising a carrier layer and also two outer layers of pressure-sensitive adhesive (PSA), wherein at least one of the PSAs of the two layers of PSA is the crosslinking product of a polymer composition which comprises at least the following components:

A) a polymer component (component A)
  comprising 88 to 100 wt. % of one or more polyacrylates (component A1) composed of at least:
  a) 1 to 15 wt. %, based on component A1,
    of one or more monomers having at least one ethylenically unsaturated bond, which are each selected such that the glass transition temperatures $T_g$ of the corresponding homopolymers of the respective monomer are at least 0° C. (monomers a),
    and at least some of the monomers (a) also have at least one carboxylic acid group (monomers a1),
  b) 85 to 99 wt. %, based on component A1,
    of one or more monomers from the group of acrylic esters and methacrylic esters, which are each selected such that the glass transition temperatures $T_g$ of the corresponding homopolymers of the respective monomer are not more than −30° C. (monomers b),
B) at least one covalently crosslinking di- or polyfunctional crosslinker (component B), where the at least one crosslinker is present in an amount such that the ratio $V=n_Z/n_P$ of the amount-of-substance $n_Z$ of the crosslinking-active centers of the crosslinker to the theoretical amount-of-substance $n_P$ of the macromolecules of the polymer component A1 possesses a value of between 0.15 and 0.60, where the amount-of-substance $n_Z$ of the crosslinking-active centers of the crosslinker is given by the mass $m_V$ of the crosslinker, multiplied by the number f of the crosslinking-active centers per crosslinker molecule, divided by the molar mass $M_V$ of the crosslinker, in other words $n_Z=f \cdot m_V/M_V$, and the theoretical amount-of-substance $n_P$ of the macromolecules of the polymer component A1 is given by the mass $m_P$ of the polymer component in the PSA, divided by the number-average molar mass $M_{n,P}$ of this component, in other words $n_P=m_P/M_{n,P}$.

Further subject matter of the invention are advantageous embodiments of such an adhesive tape, and also the use of corresponding adhesive tapes for the bonding of components of consumer electronics articles, more particularly of display windows in such articles.

The invention lastly relates to the polymer composition for producing a PSA for the adhesive tape of the invention. All statements made in relation to the crosslinked PSA in this specification, more particularly in relation to the components and their composition, apply correspondingly in respect of the uncrosslinked polymer composition. The converse also applies.

The PSA for the adhesive tape of the invention is the crosslinking product of a polymer composition which comprises at least one polymer component A and a crosslinker B. In the simplest realization of the invention, the PSA is confined to the crosslinking product of only these two components (meaning that components A and B account in total for 100% of the polymer composition prior to crosslinking). The figure of 100 wt. % is given irrespective of impurities in customary, small proportions, such as up to 3 wt. %, for example, since these impurities have no substantial effect on the attainment of the desired properties. Where possible, however, impurities ought largely to be reduced (for example, to below 1 wt. %), and ideally excluded.

Impurities here and below are those compounds which are introduced unintentionally into the system in question (together with the added monomers, for example) and which do not fall within the definition of the components which are intentionally envisaged.

Through fine-tuning between amount of crosslinker and polyacrylate component A1, and a maximum amount of resin harmonized therewith, the PSA ought not to comprise more than 5 wt. %, preferably not more than 3 wt. %, of further components C which are not embraced by the definitions of components A and B, and so components A and B account in total for at least 95 wt. %, more preferably at least 97 wt. %, of the polymer composition for producing the crosslinked PSA.

If desired in any individual case, it is possible for the PSA to be admixed with additives (component C) such as plasticizers, fillers (e.g., fibers, carbon black, zinc oxide, titanium dioxide, chalk, solid or hollow glass beads, microbeads of other materials, silica, silicates), nucleators, expandants, compounding agents and/or aging inhibitors, in the form for example of primary and second antioxidants or in the form of light stabilizers. For the invention it is of advantage, however, if any individual arbitrary combinations or the entirety of these additives are omitted, since without the additives the PSA is already fine-tuned with respect to the desired properties. More particularly, the fraction of the additives added optionally to the adhesive ought not to exceed 5 wt. %, preferably 3 wt. %. Further resins in accordance with component A2 are not considered to be additives in the above sense.

The observations made below apply not only to the PSA based exclusively on the two components A and B but also to the onward developments and modifications.
Properties of the Pressure-Sensitive Adhesive Tape and of the Parent Pressure-Sensitive Adhesive For the attainment of good pressure-sensitive adhesive properties on the part of the crosslinked polymers, the quantitative composition of the components employed is selected advantageously such as to produce a suitable glass transition point $T_g$ for the polymer, in analogy to the equation of Fox.

The pressure-sensitive adhesive tape of the invention can be outstandingly characterized via determination of the viscoelastic properties of the PSA by means of rheological investigations.

If a sample is subjected to a sinusoidal stress, as is the case, for example, in dynamic mechanical analysis (DMA), then the characteristic properties of the sample that result from its viscoelastic character are dependent, on the one hand, on the frequency of the sinus function, in other words the exposure time of each stress stage, and, on the other hand, on the temperature. These two influencing variables interact with one another. Accordingly, for the glass transition point, in other words the state in which the polymer material exhibits the greatest change in deformability (transition from the glasslike, brittle to the soft, entropy-elastic range), when subject to a load with a constant frequency and to continuous linear variation in temperature (temperature sweep), it is possible to find a characteristic glass transition temperature $T_g$; on exposure to a load at constant temperature with a continual change in frequency (frequency sweep), it is possible to ascertain a characteristic glass transition frequency $f_g$. An outstanding way of determining the glass transition frequency $f_g$ in practice is to employ the time-temperature-superposition (TTS) method, where frequency measurements conducted at regular temperature intervals are calculated to form a frequency sweep, and, consequently, the region accessible by the measurements can be expanded by a plurality of decades both downward and upward.

For the PSA used in the pressure-sensitive adhesive tape of the invention, the glass transition temperature (dynamic measurement at 10 rad/s, DMA; see below) ought advantageously not to be more than −11° C., preferably not more than −15° C.

For good repulsion properties on the part of the PSA it is advantageous if the PSA is able to dissipate energy effectively. This is evident advantageously in a favorable loss factor tan δ (ratio between loss modulus G" and storage modulus G'). Here, the storage modulus G' describes the elastic properties and the loss modulus G" the viscous properties of a viscoelastic system such as, presently, a PSA, allowing the viscoelasticity of this system to be characterized with a single material-based characteristic value. The values are accessible for example via Dynamic Mechanical Analysis (DMA) (see below, "measurement methods"). Figures for the loss factor tan δ (and also for the loss modulus G" and the storage modulus G') relate to this measurement, unless otherwise indicated in any specific case.

Very advantageously, the loss factor tan δ at 0.1 rad/s and 85° C. is in a range from 0.35 to 0.75, preferably in the range from 0.40 to 0.65, more preferably from 0.41 to 0.60.

It has been found that the shock absorbency can be characterized by the glass transition frequency $f_g$. To attain the desired properties, more particularly the shock absorbency, of the pressure-sensitive adhesive tape of the invention, it is very advantageous if the glass transition frequency at 25° C. (for the details, see below, "measurement methods") is more than 5000 rad/s. It has emerged that, in particular, PSAs whose glass transition frequency lies above this limit are capable of dissipating shock energy from short, severe impact events, such as in the case of impact after a drop, for example.

It has emerged that conclusions can be drawn about the shock absorbency from the "rolling ball tack" measurement as well. This test is typically employed in order to characterize the tack of a PSA. Effective shock absorbency was found in general for the samples for which the rolling ball test gives a result of less than 50 mm.
Component A1/Polyacrylate The polymer component A comprises in turn 88 wt. %, preferably 90 wt. % or more, up to and including 100 wt. %, of one or more polyacrylates (component A1). The polymer component A may therefore consist exclusively of the polyacrylate component A1, or else, optionally, up to 10 wt. % of one or more further components may be present. This further component may for example be wholly or partly a resin component (component A2) (see below). Accordingly, the polymer component A may be composed exclusively of the polyacrylate component A1 and the resin component A2, or else, when a resin component A2 is present, the polymer component A may comprise, as well as the polyacrylate component A1, one or more further components (A3, A4 . . . ).

The figure of 100 wt. % is given irrespective of impurities in customary, small proportions, such as up to 3 wt. %, for example, since these impurities have no substantial effect on the attainment of the desired properties. Where possible, however, impurities ought largely to be reduced (for example, to below 1 wt. %), and ideally excluded.

The polyacrylate component A1 in turn comprises in accordance with the invention
a) 1 wt. %, preferably 3 wt. %, to 15 wt. %, based on component A1,
of one or more monomers having at least one ethylenically unsaturated bond, which are each selected such that the glass transition temperatures $T_g$ of the corresponding homopolymers of the respective monomer are at least 0° C. (monomers a),
and at least some of the monomers (a) also have at least one carboxylic acid group (monomers a1),
b) 85 wt. % to 99 wt. %, preferably to 97 wt. %, based on component (A1),
of one or more monomers from the group of acrylic esters and methacrylic esters, which are each selected such that the glass transition temperatures $T_g$ of the corresponding homopolymers of the respective monomer are not more than −30° C. (monomers b).

The figures for the glass transition temperatures $T_g$ are based on the determination by means of dynamic mechanical analysis (DMA) at low frequencies (see below; "measurement methods" section) unless indicated otherwise in any specific case.

Component a and component b advantageously account in total for 100% of the polyacrylate component A1, meaning that the polyacrylate component A is composed exclusively of these components. The figure of 100 wt. % is given irrespective of impurities in customary, small proportions, such as up to 3 wt. %, for example, since these impurities have no substantial effect on the attainment of the desired properties. Where possible, however, impurities ought largely to be reduced (for example, to below 1 wt. %), and ideally excluded.

It is also possible, however, for the fractions of components a and b as a proportion of component A1 to add up to less than 100 wt. %. In that case the polyacrylate component A comprises one or more further components c, d, . . . (comonomers c, d, . . . ), in total up to a weight fraction (based on 100 wt. % of the polyacrylate component A1) of not more than 12 wt. %, preferably of not more than 10 wt. %.

As comonomers c, d, . . . it is possible to use the customary comonomers for polyacrylates that are known to the skilled person.

Very advantageously, the fraction of the monomers a1 as a proportion of the polyacrylate component A1, i.e., the fraction of the monomers which have at least one carboxylic acid group, is 3 to 5 wt. % (based on the polyacrylate component A1). A fraction of at least 3 wt. % of monomers containing carboxylic acid groups ensures a significant increase in reactivity in respect of the added crosslinker, and leads to good reaction rates in the crosslinking procedure.

Monomers of the type of component a1 having at least one ethylenically unsaturated bond, which are selected such that the glass transition temperatures $T_g$ of the corresponding homopolymers are at least 0° C., and which have at least one carboxyl group, are preferably selected from the group encompassing acrylic acid and/or methacrylic acid, with acrylic acid being used with particular preference.

Component A1 may comprise exclusively, as monomers a, those of type a1, or else component a may be composed of a portion of monomers of type a1 and a portion of further comonomers ai, which are each selected such that the glass transition temperatures $T_g$ of the corresponding homopolymers of the respective monomer are at least 0° C., but which do not have a carboxylic acid group.

As comonomers ai it is possible, to outstanding effect, to use—wholly or partly—monomers a2, which are selected from the group of compounds having at least one ethylenically unsaturated bond, specifically such that the glass transition temperatures $T_g$ of the corresponding homopolymers of the respective monomer a2 are at least 0° C., the monomers a2 additionally having at least one ester group with an ethyl and/or methyl radical. The monomers in question are more particularly acrylic and/or methacrylic esters, and so the group a2 then encompasses methyl acrylate, ethyl acrylate, methyl methacrylate, and ethyl methacrylate. By means of the monomers a2 it is possible to influence the polarity of the PSA. For the intended application there is an advantage to the effect that suitability is to exist for the bonding of materials such as glass, polymethyl methacrylate (PMMA), polyethylene terephthalate (PET), polycarbonate (PC), and the like, which are themselves more or less strongly polar. In order to improve the adhesion to such substrates, it may be advantageous if polar comonomers such as the aforementioned class of compound is used, which via van der Waals forces and/or dipole-dipole interactions are able to raise the adhesion of the adhesive to the substrate. If, however, component a2 is used in a very high amount, it is generally to the detriment of the shock absorption capacity of the composition, since polar monomers typically possess corresponding homopolymers with high glass transition temperatures and, therefore the PSA becomes too hard and brittle. It is therefore advantageous to use not more than 10 wt. % of the monomers a2 as comonomers.

Component A1 may comprise exclusively, as monomers a, those of types a1 and a2; alternatively, component a may be composed of one portion of monomers of type a1, one portion of monomers of type a2, and one portion of further comonomers of type a3, which falls within the definition for the monomers a, but not within the definition of the type a1 or of the type a2. The comonomers of type a3 carry neither a carboxylic acid group nor an ester group having an ethyl and/or methyl radical. It is also possible for component A1 to comprise exclusively monomers a of types a1 and a3.

Monomers of type a3 may be useful in particular for regulating the glass transition temperature and/or the glass transition frequency of the resultant PSA in the direction of the value that is the ultimate objective.

As monomers a3 it is possible—for example and with no claim to completeness—to use the following monomers: benzyl acrylate, benzyl methacrylate, phenyl acrylate, phenyl methacrylate, isobornyl acrylate, isobornyl methacrylate, t-butylphenyl acrylate, t-butylphenyl methacrylate, cyclohexyl methacrylate, 3,3,5-trimethylcyclohexylacrylate, 4-biphenylyl acrylate, 4-biphenylyl methacrylate, 2-naphthyl acrylate, 2-naphthyl methacrylate, phenoxyethyl acrylate, phenoxyethyl methacrylate, dimethylaminopropylacrylamide, dimethylaminopropylmethacrylamide, and also N,N-dialkyl-substituted amides, such as N,N-dimethylacrylamide, for example, acrylonitrile, vinyl ethers, such as vinyl methyl ether, ethyl vinyl ether, vinyl isobutyl ether, vinyl esters, styrene, a- and p-methylstyrene, macromonomers such as 2-polystyreneethyl methacrylate (molecular weight Mw of 4000 to 13 000 g/mol), and poly(methylmethacrylate) ethyl methacrylate (Mw of 2000 to 8000 g/mol).

It is advantageous if component a2, component a3, or the sum total of components a2 and a3, account for up to 12 wt.

%, more particularly up to 10 wt. %, of component A1, and especially if component a1 accounts for a fraction of 3 to 5 wt. % of component A1.

The polyacrylate component A1 further comprises, to an extent of 85 to 99 wt. %, one or more monomers b, the monomers b being selected from the group of the acrylic esters and methacrylic esters, with the proviso that the glass transition temperature $T_g$ of the corresponding homopolymers of a respective monomer b is to be not more than $-30°$ C. As monomers of the type of component b it is possible for example to make use in whole or in part, and in particular in combination with the monomers stated below, of esters of acrylic acid in which the alkyl group is linear and has at least 3 C atoms, preferably up to 14 C atoms. With more particular advantage it is possible to use acrylic esters having linear alkyl radicals with 4 to 9 carbon atoms. For the aforementioned monomers, preference is given to using unsubstituted acrylic esters. Monomers identified by way of example are propyl acrylate, n-butyl acrylate, n-pentyl acrylate, n-hexyl acrylate, n-heptyl acrylate, n-octyl acrylate, n-nonyl acrylate, n-decyl acrylate, n-undecyl acrylate, n-dodecyl acrylate, n-tridecyl acrylate, n-tetradecyl acrylate.

For component b, alone or as comonomers, it is also possible to use acrylic esters having branched hydrocarbon radicals and/or hydrocarbon radicals substituted by functional groups, provided the condition for the glass transition temperature is met. For these monomers as well, mention may be made, by way of example and with no claim to completeness, of a number of monomers which can be used advantageously: 2-heptyl acrylate, 2-octyl acrylate, 2-ethoxyethyl acrylate, 2-ethylhexyl acrylate, 2-ethylbutyl acrylate, 3-methoxybutyl acrylate, 2-methoxyethyl acrylate, 3-methoxypropyl acrylate, 3-methylbutyl acrylate, isodecyl acrylate.

A series of methacrylic esters as well can be used effectively as component b), with the $T_g$ condition again being observed. Examples of such monomers are octadecyl methacrylate, decyl methacrylate, dodecyl methacrylate.

The aforementioned monomers and also further monomers which have a glass transition temperature of not more than $-30°$ C. can be used in each case alone or in combination with one or more further monomers of this kind. Thus, for example, the combination of n-butyl acrylate and ethylhexyl acrylate is a good monomer mixture for component b.

Preparation of the Polyacrylate Component A1

The polyacrylate component A1 can be prepared by polymerization from the stated components in accordance with the customary processes known to the skilled person, more particularly by radical polymerization. The polymerization is preferably conducted such that the number-average molecular weight $M_n$ of the resultant polymer is at least 50 000 g/mol. A figure of 250 000 g/mol for the number-average molecular weight $M_n$ ought preferably not to be exceeded. Very preferably the number-average molecular weight $M_n$ of the polyacrylate component A1 is situated within a range between 50 000 g/mol and 150 000 g/mol. All figures for molecular weights of polymers are based on the measurement by means of gel permeation chromatography; see below, "measurement methods" section.

Component A2/Resins

The polymer component A may optionally comprise up to 12 wt. %, preferably up to 10 wt. %, of a resin component (component A2), comprising one or more resins. Resins in the sense of this specification are oligomeric and polymeric compounds having a number-average molecular weight $M_n$ of not more than 5000 g/mol (gel permeation chromatography, see below). In particular, the predominant part of the resins (based on the part by weight as a proportion of the overall resin component), and preferably all of the resins, have a softening point of 80 to 150° C. The figures for the softening point $T_s$ of polymeric compounds are given in reference to values determined by means of the ring & ball method in accordance with DIN EN 1427:2007 (see below, "measurement methods" section), unless indicated otherwise in any specific case.

A resin fraction of more than 12 wt. % as a proportion of the polymer component ought to be avoided, since such high resin fractions impact negatively on the shock absorption properties. The resin fraction preferably does not exceed 10 wt. %.

For the resin component A2 it is possible to use natural and/or synthetic resins. In principle it is possible to use all resins whose softening point is within the stated temperature range. Suitable tackifier resins include, among others, rosin and rosin derivatives (rosin esters, including rosin derivatives stabilized by hydrogenation or by disproportionation, for example), polyterpene resins, terpene-phenolic resins, alkylphenolic resins, aliphatic, aromatic, and aliphatic-aromatic hydrocarbon resins, to name but a few. Selected with great preference are resins which are compatible with the polyacrylate component (soluble in it or homogeneously miscible with it).

The admixing of a resin component may be used advantageously for regulating the glass transition range of the PSA (as a whole). Furthermore, the admixing of one or more resins frequently contributes to a greater ability to dissipate energy, thus allowing an admixture of resin to be utilized for the purpose of fine-tuning the loss factor.

Component B/Crosslinker

For the crosslinking of the PSA, at least one di- or polyfunctional crosslinker (component B) in the defined amount is added to the polyacrylate system that is to be crosslinked. The crosslinker is capable of constructing linkage sites via the carboxylic acid groups of the polyacrylate (introduced by means of component a1).

In accordance with the invention the crosslinker (or crosslinkers where there are two or more) is or are added in an amount such that the ratio V is in the range from 0.15 to 0.60. The value of V is preferably 0.2 or more, and more particularly it is situated in the range from 0.22 to 0.58.

In accordance with the invention it is also possible to use two or more crosslinkers. If two or more crosslinkers are used, in particular with different functionalities as well, the variable to be put into the definition given in claim 1 for the ratio V:

$V=n_Z/n_P$, where $n_Z$ is the amount-of-substance of the crosslinking-active centers, totaled over all of the crosslinkers, is:

$$n_Z = f_1 \cdot m_{V,1}/M_{V,1} + f_2 \cdot m_{V,2}/M_{V,2} \ldots$$

where the index 1 denotes the value of the first crosslinker, 2 that of the second crosslinker, and so on.

Assuming knowledge of the number-average molecular weight (GPC) of the polymer sample, the amount of crosslinker to be added in accordance with the main claim is easy to determine when the average molecular weight of the crosslinker and its functionality are known. Where only one crosslinker is present, the initial mass of the crosslinker $m_V$ advantageously used, with the definitions of the corresponding values introduced, is given by the initial mass of the polymer component $m_P$ and by its number-average molar mass $M_{n,P}$, as follows ($M_V$=molecular weight of the crosslinker):

$$m_V = \frac{V \cdot m_P \cdot M_V}{M_{n,P} \cdot f}$$

Where there are two or more crosslinkers, in particular with different functionalities, this formula must be adapted accordingly.

The crosslinking density of the crosslinked PSA corresponds in good approximation to an average of 0.15 to 0.60 crosslinking sites per macromolecule of the polymer component, especially if the crosslinking reaction is carried out through to a largely complete conversion.

The crosslinker or crosslinkers are covalently crosslinking crosslinkers which are able to react with carboxyl groups. Selected with particular advantage as the crosslinker component is a chemically bonding (covalently crosslinking) system, in order to ensure sufficient temperature stability (in compositions crosslinked with crosslinkers that do not bond chemically, such as chelate crosslinkers, for example, the crosslinking sites would come undone again at high temperatures, and so the system would lose its cohesion properties). The crosslinker, then, is more particularly a crosslinker which is capable of forming covalent bonds, via the carboxylic acid groups, with the macromolecules of the polyacrylate; for each functionality of the crosslinker molecule, it is possible for one linking site to be created [a difunctional crosslinker is therefore able to join two macromolecules to one another via two linking sites; a trifunctional crosslinker is able to join three macromolecules to one another via three linking sites (in each case by means of one carboxylic acid group per macromolecule) or to join two macromolecules to one another via three linking sites (by means of one carboxylic acid group of a macromolecule and two carboxylic acid groups of the second macromolecule), etc.]. It has emerged as very advantageous if a crosslinking density is realized that corresponds on average per macromolecule of the polymer component to 0.15 to 0.6, more particularly 0.22 to 0.58, crosslinking sites. For this purpose it is especially advantageous if the crosslinking reaction is carried out very largely in the direction of a complete conversion (preferably >90%, more preferably >95%). With the advantageously realized degree of crosslinking, the cohesion of the crosslinked composition is high enough that it does not split under flexural stress, but also low enough that under flexural stress there is no adhesive failure of the composition (avoidance of overcrosslinking through appropriate choice of the number of crosslinking sites).

The crosslinker or crosslinkers are advantageously selected such that under normal storage conditions, to which the uncrosslinked PSAs are frequently subjected, they do not enter into any significant reactions with hydroxyl functions and/or in particular with water. By this means it is possible to avoid reductions in reactivity as a result of such reactions, as is frequently the case when using crosslinkers such as isocyanate. Very suitable crosslinkers are those having three or four functional groups per crosslinker molecule (tri- and tetrafunctional crosslinkers). Chemical compounds that have emerged as particularly suitable crosslinkers, which also have good shelf lives, are those which carry not only epoxy groups but also amine groups. Particularly highly suitable such crosslinkers have, for example, at least one amine group and at least two epoxy groups in the molecule; very much more effective crosslinkers have, for example, two amine groups and four epoxy groups. A crosslinker which has emerged as being outstandingly suitable is N,N,N',N'-tetraglycidyl-meta-xylenediamine (CAS No. 63738-22-7). Also very highly suitable is 1,3-bis(N,N-diglycidylaminomethyl)cyclohexane (CAS No. 65992-66-7). These crosslinkers with epoxy groups and amine groups in the molecule are notable for long stability (possible processing time, "potlife") of the crosslinker solution, do not exhibit any reduction in reactivity due to reactions with water, and are nevertheless characterized by a high crosslinking rate. By means of these crosslinkers it is possible, furthermore, to realize defined degrees of crosslinking within the target range of this specification, without any significant aftercrosslinking occurring during storage of the crosslinked products.

To ensure the optimum crosslinking it is advantageous if, apart from the covalently crosslinking crosslinkers selected, there are no other crosslinkers present that react by other crosslinking mechanisms (such as chelate crosslinkers, for example).

Summary of the Components of the Pressure-Sensitive Adhesive (for Ease of Comprehension):

Component A: polymer component
Component B: crosslinker(s) (di- or polyfunctional)
Component A1: polyacrylate component; subcomponent of component A
Component A2: resin component; optional subcomponent of component A
Components A3, A4, . . . : optional subcomponents of component A
Component a (formed from monomers a): subcomponent of polyacrylate component A1 [monomers having at least one ethylenically unsaturated bond, which are each selected such that the glass transition temperatures $T_g$ of the corresponding homopolymers of the respective monomer are at least 0° C.]
Component b (formed from monomers b): subcomponent of component A1 [(meth)acrylic esters, which are each selected such that the glass transition temperatures $T_g$ of the corresponding homopolymers of the respective monomer are not more than −30° C.]
Components c, d, . . . : optional subcomponents of component A1
Component a1 (formed from monomers a1): subcomponent of component a [having one or more carboxylic acid groups]
Component a2 (formed from monomers a2): optional subcomponent of component a [having at least one ester group with an ethyl and/or methyl radical]
Component a3 (formed from monomers a3): optional subcomponent of component a [without carboxylic acid group and without ester group with ethyl or methyl radical]

In the listing above, the term "subcomponent" is not intended to rule out linguistically a 100% fraction of this component.

Carrier Film

Employed advantageously as carrier material for the adhesive tape of the invention is a polymeric film, more preferably a film of PET (polyethylene terephthalate). The layer thickness of the carrier film is preferably 4 to 50 μm. The carrier film serves more particularly as a stabilizing film for the adhesive tape, to facilitate or—depending on the nature (cohesion) of the PSA—even enable—the converting operation, more particularly the diecutting of sheetlike shapes (adhesive tape sections, called "diecuts"). A further effect of the film is an improved, facilitated removability (redetachability) on the part of the bonded adhesive tape from a substrate.

ADHESIVE TAPE CONSTRUCTION

Figure 1:
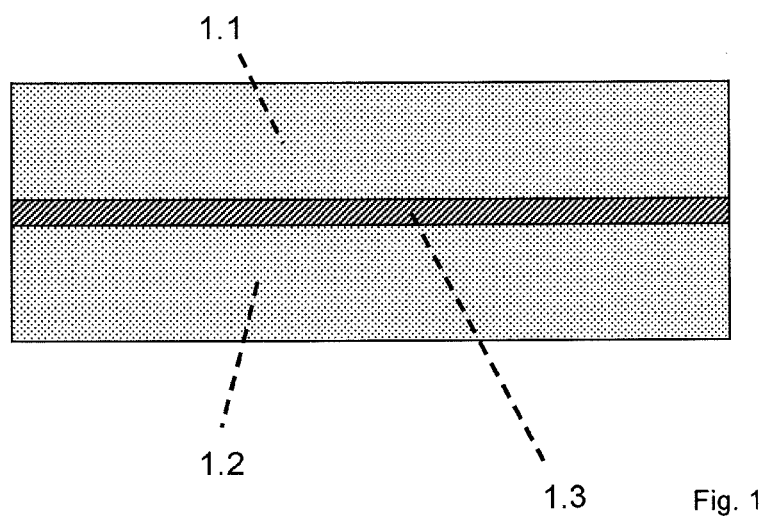
FIG. 1 shows a symmetric adhesive tape according to the presently claimed invention, wherein reference numbers 1.1 and 1.2 depict PSA layers, and reference number 1.2 depicts a carrier film.
Figure 2:
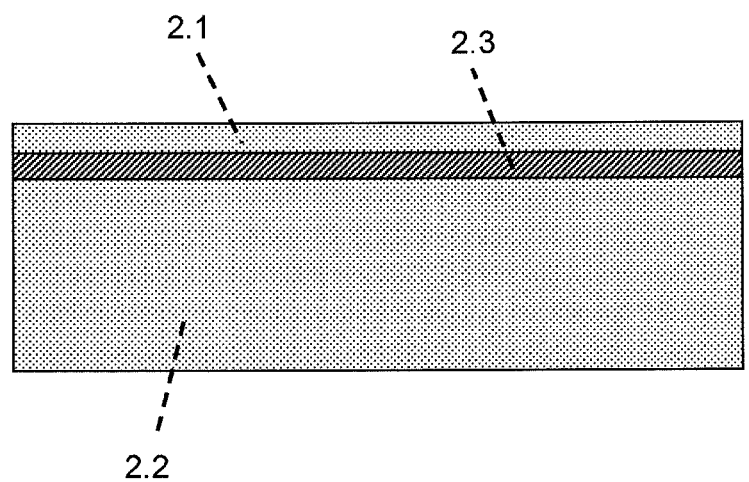
FIG. 2 shows an asymmetric adhesive tape according to the presently claimed invention, wherein reference numbers 2.1 and 2.2 depict PSA layers and reference number 2.3 depicts a carrier film.

With particular preference the pressure-sensitive adhesive tapes of the invention have a thickness in the range from 100 to 300 µm. The carrier film here may be arranged symmetrically or asymmetrically between the layers of PSA. Preferred carrier films used are those having a thickness in the range from 4 to 50 µm. It is advantageous if the thickness of the carrier is selected such that it accounts for not more than 20%, more particularly not more than 10%, of the overall thickness of the pressure-sensitive adhesive tape, so that the carrier fraction of the adhesive tape thickness is not too high and so that the desired adhesive tape properties attributable to the PSA can be manifested.

It is advantageous if the pressure-sensitive adhesive tape has a geometrically symmetrical construction—that is, if the layers of PSA are of equal thickness on either side of the carrier film.

It is also of advantage, especially in combination with the geometrical symmetry, if the PSAs on both sides of the adhesive tape of the invention are chemically identical—if, therefore, the PSA used on both sides is of the kind represented above in its basic form or as one of its variant embodiments.

An adhesive tape of the invention that has emerged as being particularly advantageous is a tape which has a chemically and geometrically symmetrical construction, an overall thickness of 200 µm, and, as carrier, a PET film having a thickness of 12 µm (thickness of each of the PSA layers: 94 µm).

An advantage afforded by symmetrical adhesive tapes is that of offering optimum shock absorbency and stress compensation ability with respect to influences on each side. Particularly for applications where one or both disruptive influences are anticipated entirely or primarily from one side, it may also be of advantage to use asymmetric adhesive tapes, with the layer of PSA oriented to the disruption side preferably constituting the thicker of the two PSA layers, in order there to bring about optimum compensation of the disruptions. In this case, the overall thickness of the adhesive tape can be reduced by the designing of the opposite layer of PSA, in other words the layer situated on the side susceptible to disruption, as a thin layer. This opposite PSA layer may be chemically identical to the thicker PSA layer, but may also be chemically different, particularly for adaptation to the particular substrate to which bonding takes place.

For greater ease of handling, such as for winding up in the form of a roll, for example, the double-sided adhesive tape of the invention may be provided on one or both sides with a liner comprising a temporary lining material, advantageously of paper or of a corresponding film, more particularly a double-sidedly siliconized paper or double-sidedly siliconized film, or a silicone film in order to ensure longer storage and convenient handling in the course of use.

Lastly, the invention relates to a pressure-sensitive adhesive for an adhesive tape, comprising a carrier layer and also two outer layers of pressure-sensitive adhesive, and also the corresponding adhesive tape itself, wherein at least one of the PSAs, namely that identified above, is the crosslinking product of a polymer composition which comprises at least the following components:

A) a polymer component (component A)
   comprising 88 to 100 wt. % of one or more polyacrylates (component A1) composed of at least:
     a) 1 to 15 wt. %, based on component A1,
       of one or more monomers having at least one ethylenically unsaturated bond, which are each selected such that the glass transition temperatures $T_g$ of the corresponding homopolymers of the respective monomer are at least 0° C. (monomers a),
       and at least some of the monomers (a) also have at least one carboxylic acid group (monomers a1),
     b) 85 to 99 wt. %, based on component A1,
       of one or more monomers from the group of acrylic esters and methacrylic esters, which are each selected such that the glass transition temperatures $T_g$ of the corresponding homopolymers of the respective monomer are not more than −30° C. (monomers b),
B) at least one covalently crosslinking di- or polyfunctional crosslinker (component B),
where components A and B account in total for at least 95 wt. % of the polymer composition, and where the loss factor tan δ (ratio between loss modulus G" and storage modulus G' of the PSA at 0.1 rad/s and 85° C., measured by means of DMA, is in a range from 0.35 to 0.75, and the glass transition frequency $f_g$ at 25° C., determined by DMA measurement, is more than 5000 rad/s.

This adhesive more particularly exhibits a good temperature stability, characterized by a slip travel of less than 1000 µm at 200° C. in the SAFT test (see below, "measurement methods" section).

The PSA having the stated loss factor properties and glass transition frequency properties, and preferably the identified temperature stability as well, is more particularly an adhesive of the kind described further in the context of this specification and in the claims. Accordingly, the observations made in the context of this specification also apply preferably to this PSA.

Use

The invention relates, lastly, to the use of the polymer composition for producing crosslinked PSAs for double-sided pressure-sensitive adhesive tapes of the type depicted within this specification, and also to the use of the double-sided pressure-sensitive adhesive tapes of the invention for bonding constituents, especially transparent constituents, more particularly windows (glass sheets, polymer sheets), to plastics, glass, or metals. The invention relates particularly to bonding of this kind for electronic, electrical and/or mechanical devices, more particularly electronic, electrical and/or mechanical end devices or ultracompact devices, which on account of their size and weight can be carried without substantial physical effort and can therefore be employed on a mobile basis, and are therefore envisaged in particular as personal items (known as mobile devices or portable devices), examples being mobile telephones, smartphones, and personal digital assistants (PDAs, e.g., organizers, handhelds, palmtops); additionally, ultracompact computers (mobile computers, pocket computers) such as, for example, laptops, notebooks, and tablet PCs; additionally, operating units for computers and electronic devices such as games consoles, game pads, remote controls, touchscreens, touchpads, and graphics tablets; additionally, radio devices, GPS devices, navigation devices, portable interface devices in satellite communication; additionally, electronic devices for the reproduction of electronic (entertainment) media, such as, for example, Walkmans and Discmans, MP3 players, pocket televisions, and pocket radios, or E-book readers; additionally, digital cameras, film cameras, and video cameras; additionally, watches, digital clocks, calculators; additionally, medical mobile devices and/or those for sports persons, such as blood sugar measurement devices, blood pressure measurement devices, pulse meters, medical monitoring and/or control devices and/or monitors, pedometers, and tachometers. The above indications are made with no claim to completeness.

MEASUREMENT METHODS/DETAILS OF STATED PARAMETER VALUES

I: Measurements with the Uncrosslinked Polyacrylate (Polymerization Product)
Average Molecular Weight The figures for number-average molar mass $M_{N,P}$ and for the polydispersity PD in this specification relate to the determination made by gel permeation chromatography (GPC). The determination is made on 100 µl of clear-filtered sample (sample concentration 4 g/l). The eluent used is tetrahydrofuran with 0.1% by volume of trifluoroacetic acid. The measurement is made at 25° C.

The preliminary column used is a column of type PSS-SDV, 5 µm, $10^3$ Å, 8.0 mm×50 mm (details here and below in the following order: type, particle size, porosity, internal diameter×length; 1 Å=$10^{-10}$ m). Separation takes place using a combination of columns of type PSS-SDV, 5 µm, $10^3$ Å and also $10^5$ Å and $10^6$ Å, each of 8.0 mm×300 mm (columns from Polymer Standards Service; detection by means of Shodex RI71 differential refractometer). The flow rate is 1.0 ml per minute. Calibration takes place against PMMA standards (polymethyl methacrylate calibration).

II: Measurements with the Resin
Softening Point $T_s$

The softening point $T_s$ of resins is determined by means of the ring & ball method, by corresponding application of the provisions of DIN EN 1427:2007 (investigation of the resin sample instead of bitumen, with the procedure otherwise retained). The measurements are made in a glycerol bath. The reports relating to the softening point relate to the results of this measurement.

III: Measurements with the Double-Sided Adhesive Tape

For the investigations below, a symmetrical double-sided adhesive tape (total thickness 200 µm, carrier film PET 12 µm) was used (for production see below).

Glass Transition Temperatures $T_g$; Glass Transition Frequencies $f_g$; Loss Factor Tan δ

Glass transition temperatures $T_g$, glass transition frequencies $f_g$, and the loss factor tan δ were determined by dynamic mechanical analysis (DMA); the procedures selected here were as follows: glass transition temperatures were determined by means of temperature sweep, glass transition frequencies by means of time-temperature superposition methods (TTS), and loss factor values (and also loss modulus values and storage modulus values) by means of frequency sweep. All figures in the context of this specification relate to the results of these measurements, unless otherwise indicated individually.

In DMA, use is made of the fact that the properties of viscoelastic materials subject to a sinusoidal mechanical stress are dependent on the frequency of the stress (in other words on the time) and on the temperature. In the case of the TTS method, frequency measurements conducted at regular temperature intervals are calculated to give a frequency sweep; by this means, the range accessible through the measurements can be expanded by a number of decades downward and upward.

All DMA Procedures:
Instrument: Rheometric Scientific RDA III; measuring head: spring-mounted with standard force; heating: heating chamber; measurement geometry: parallel plate arrangement, sample thickness 1 (±0.1) mm; sample diameter 25 mm (to produce a sample 1 mm thick, 5 layers (each 200 µm) of the adhesive tape under investigation were laminated one to another; since the PET carrier does not make any critical contribution to the rheological properties, its presence can be disregarded).

Temperature Sweep:
Measuring frequency 10 rad/s; temperature range −40° C. to +130° C.; heating rate 2.5° C./min; deformation 1%

Frequency Sweep:
Measuring frequency: 0.1 to 100 (512) rad/s; temperature 25° C.; stress 2500 Pa; deformation 1%

TTS Measurement:
Measuring frequency 0.1 to 512 rad/s; temperature −35° C. to +190° C. in 15° C. steps; deformation 1%

Rolling Ball Tack
The rolling ball tack was measured by the PSTC-6 method (Test Methods for Pressure Sensitive Adhesive Tapes, $15^{th}$ Edition; publisher: Pressure Sensitive Tape Council, Northbrook (Illinois), USA), with the following modifications having been made:
use of stainless steel ball bearings (stainless steel 1.4401), diameter 7/16 inch (11.11 cm), mass 5.7 g
bearing preparation: thorough cleaning with cellulose and acetone; the clean bearings are stored in an acetone bath for 15 minutes prior to the measurement series (bearings fully surrounded by acetone); at least 30 minutes before the commencement of measurement, the bearings are removed from the acetone bath and stored open, for drying and conditioning, under standard conditions (23±1° C. 50±5% relative humidity)
each bearing is used only for one measurement.

The tack was determined as follows: as a measure of the tack with a very short contact time, the rolling ball tack was recorded. A strip of the adhesive tape approximately 30 cm in length was fastened horizontally to the test plane with the adhesive side upward, under tension. For the measurement, the steel bearing was accelerated under terrestrial gravity by rolling down a ramp with a height of 65 mm (angle of inclination: 21°). From the ramp, the steel bearing was steered directly onto the adhesive surface of the sample. The distance traveled on the adhesive by the bearing before reaching standstill was recorded. The temperature at the measurement site, and that of the bearings, during the measurement was 23±1° C.

The roll travel length determined in this way is used here as an inverse measure of the tack of the self-adhesive (that is, the shorter the rolling distance, the higher the tack, and vice versa). The respective measurement value was given (as a reported length in mm) from the average of five individual measurements each on five different strips of the adhesive tape.

Figure 3:
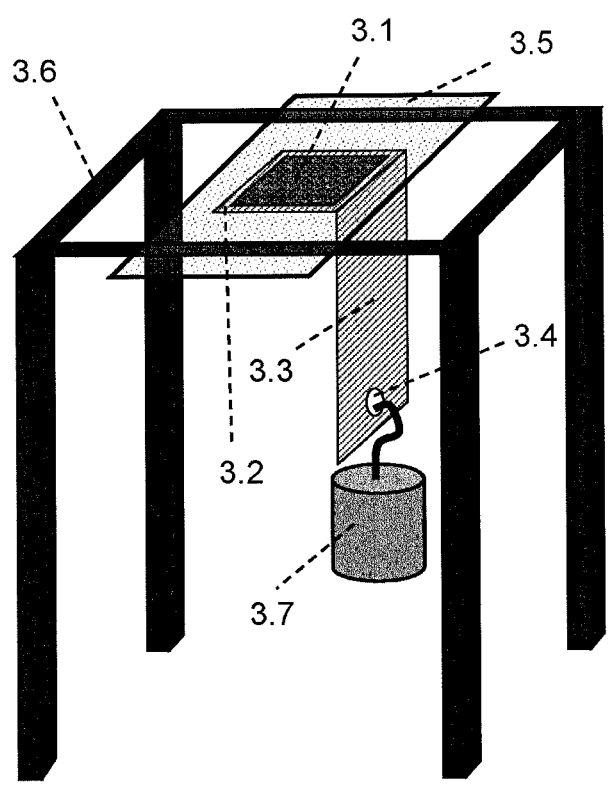
FIG. 3 is an illustration of a cleavage test implementation for testing an adhesive tape.

Cleavage Test
(FIG. 3 shows the test implementation phase; the position numbers of the relevant parts have also been used below for the description of the preparation phase)

Investigation Materials:
SUS304 steel T-square, cleaned with acetone, steel surfaces 30 mm×30 mm (3.2) and 30 mm×60 mm (3.3) with 90° angle between the surfaces; hanging loop (3.4) in the larger surface (3.3)
Polycarbonate plates (PC plates) and polymethyl methacrylate plates (PMMA plates) (3.5), each 75 mm×50 mm
Weight (3.7), 250 g, with hook for hanging
Steel frame (3.6)

Test Preparation:
The PC plates were stored at 85° C. for 24 hours and conditioned at room temperature for 30 minutes prior to bonding.
The PMMA plates were stored at 70° C. for 24 hours and conditioned at room temperature for 30 minutes prior to bonding.
The double-sided adhesive tape under investigation was adhered by one side to a release paper and cut into samples (3.1) measuring 25 mm×25 mm. The square samples of adhesive tape (3.1) were adhered with the free adhesive side in each case centrally to the outside of the smaller surface (3.2) of a steel T-square, and then the release paper was peeled off and the now exposed adhesive surface was adhered centrally to a PC plate or PMMA plate (3.5), so that the larger surface (3.3) of the steel T-square was pointing vertically upward. The smaller, horizontal steel T-square surface (3.2) was loaded with a 6 kg weight for 10 minutes in order to generate a sufficient application pressure for both bonds of each sample. The weight was then removed and the sample was left standing in this state at room temperature for 24 hours (action of the adhesives on the respective substrate).
The samples were subsequently acclimatized in a drying cabinet at 85° C. for 10 minutes.
Test Procedure (See FIG. 3)
The PC or PMMA plate (3.5) with the steel T-square (3.2, 3.3) bonded by means of the adhesive tape sample (3.1) is placed onto the steel frame (3.6) in such a way that the steel T-square (3.2, 3.3) hangs downward (larger surface (3.3) points vertically downward). The weight (3.7) (250 g) is then hung into the loop, so that the bond is loaded, and this time point is recorded as the start time.
For each of the adhesive tapes under investigation, 10 identical samples were produced and 5 measurements each were carried out with the PC plate and with the PMMA plate. The test is passed if after 72 hours in each case, the steel T-square had not fallen off in any of the 10 measurements.
Falling Ball Test
This test provides information on the shock resistance of the adhesive tape of the invention and of sample specimens bonded with comparative samples, attributable to the shock absorption capacity of the adhesive tape.
A square sample with a frame shape was cut from the adhesive tape under investigation (external frame dimensions 33 mm×33 mm; frame-edge width 3.0 mm; internal dimensions ("window") 27 mm×27 mm). This sample was adhered to an ABS frame (external dimensions 50 mm×50 mm; internal dimensions ("window") 25 mm×25 mm; thickness 3 mm). Adhered to the other side of the double-sided adhesive tape was a PMMA window of 30 mm×30 mm. The bonding of ABS frame, adhesive tape frame, and PMMA window was carried out such that the geometric centers and the diagonals lay in each case one above another (corner-to-corner). The bond area was 360 mm². The bond was pressed under 10 bar for 5 s and left to rest for 24 hours.
The bonded assembly of ABS frame, adhesive tape, and PMMA window was placed, with the protruding edges of the ABS frame, on a rack in such a way that the assembly was aligned horizontally and the PMMA window pointed downward in free suspension. A steel ball (diameter 15 mm, mass 5.6 g) was dropped vertically from a height of 250 cm onto the sample thus configured (measurement conditions 23° C., 50% relative humidity). With each sample, three investigations were carried out.

The falling ball test is passed if the bond has not parted in any of the three investigations.
SAFT—Shear Adhesive Failure Temperature
This test is used for accelerated testing of the shear strength of adhesive tapes under temperature load. For the test, the adhesive tape under investigation is adhered to a heatable steel plate and loaded with a weight (50 g), and the shear travel is recorded.
Preparation of Samples for Measurement:
The adhesive tape under investigation is adhered to an aluminum foil 50 µm thick. The adhesive tape thus prepared is cut to a size of 10 mm×50 mm.
The cut-to-size adhesive tape sample is bonded to a polished steel test plate cleaned with acetone (steel material 1.4301, DIN EN 10088-2, surface 2R, surface roughness Ra=30 to 60 nm, dimensions 50 mm×13 mm×1.5 mm) in such a way that the bond area of the sample is 13 mm×10 mm=height×width and the steel test plate protrudes by 2 mm at the upper edge. The bond is then fixed by rolling a 2 kg steel roller over it six times at a speed of 10 m/min. At the top the sample is reinforced flush with a stable adhesive strip which serves as a support for the travel sensor. Using the steel plate, the sample is then suspended such that the adhesive tape end with the longer overhang points vertically downward.
Measurement:
The sample for measurement is loaded at the bottom end with a 50 g weight. The steel test plate with the bonded sample is heated to the end temperature of 200° C., beginning at 25° C. and with a rate of 9° C. per minute.
The slip travel of the sample is observed by means of a travel sensor, as a function of temperature and time. The maximum slip travel is set at 1000 µm (1 mm); if exceeded, the test is discontinued. Test conditions: room temperature 23±3° C., relative atmospheric humidity 50±5%.
The test is considered passed (the sample sufficiently temperature-resistant) if at 200° C. the slip travel has not exceeded the figure of 1000 µm. If the test is failed, the temperature at the point of attainment of the maximum slip travel (1000 µm) is reported (in ° C.).
Experimental Section
Preparation of the Pressure-Sensitive Adhesive
A conventional 2 L glass reactor suitable for radical polymerizations with evaporative cooling was charged with 300 g of a monomer mixture comprising 142.5 g of butyl acrylate, 142.5 g of ethylhexyl acrylate, and 15 g of acrylic acid, and with 200 g of acetone: special-boiling-point spirit 60/95 (1:1). After nitrogen gas had been passed through the reactor for 45 minutes with stirring, the reactor was heated to 58° C. and 0.15 g of 2,2'-azodi(2-methylbutyronitrile) (Vazo 67®, DuPont), in solution in 6 g of acetone, was added. The external heating bath was then heated to 75° C. and the reaction was carried out constantly at this external temperature. After a reaction time of 1 h a further 0.15 g of VAZO 67®, in solution in 6 g of acetone, was added. After 3 hours, the batch was diluted with 90 g of acetone/special-boiling-point spirit 60/95 (1:1).
After a reaction time of 5:30 hours, 0.45 g of bis(4-tert-butylcyclohexanyl) peroxydicarbonate (Perkadox 16®, Akzo Nobel), in solution in 9 g of acetone, was added. After a reaction time of 7 hours, a further 0.45 g of bis(4-tert-butyl-cyclohexanyl) peroxydicarbonate (Perkadox 16®, Akzo Nobel), in solution in 9 g of acetone, was added. After a reaction time of 10 hours, the batch was diluted with 90 g of acetone/special-boiling-point spirit 60/95 (1:1). The reaction was terminated after a time of 24 hours, and the batch was cooled to room temperature. For all of the resultant polymers thus prepared, the number-average molecular weight was in the region of $M_n$=100 000 g/mol (see table).

The polymer was then blended with the appropriate amount of crosslinker [Examples 1 to 15: tetraglycidyl-meta-xylenediamine; Erisys® GA-240; 3% strength solution in acetone; Example 16: aluminum(III) acetylacetonate, 3% strength solution in acetone] and also, for the resin-blended adhesives, with the corresponding amount of tackifier resin (Sylvares TP 95®; terpene-phenolic resin, softening temperature 92 to 98° C. (typical value 95° C.; manufacturer figure, Arizona Chemical)) and diluted to a solids content of 40% with acetone/special-boiling-point spirit 60/95 (1:1).

Proportions for crosslinker and resins—see figures in table 1 in each case; the figure for the part by weight of crosslinker is based on the amount of pure crosslinker (without diluent) and is standardized to 100 parts by weight of the polyacrylate component A1 in each case.

Production of the Double-Sided Pressure-Sensitive Adhesive Tape Assembly:

The 40% strength solution of polymer composition was coated onto a liner material (siliconized release paper) and dried at 120° C. for 15 minutes, during which the crosslinking reaction took place. Drying gave a crosslinked layer of PSA with a thickness of 94 µm.

The PSA layers produced in this way were laminated by customary methods onto both sides of a PET carrier film 12 µm thick, to give a double-sided symmetrical pressure-sensitive adhesive tape with a total thickness of 200 µm.

The results of the experiments are shown in Table 1.

The suitability of the PSA for the required field of use is evident by its passing the cleavage test and the falling ball test. For this purpose it is necessary for the rheological properties of the PSA to be very precisely adjusted. In accordance with the invention this is done through the nature and amount of the polymers used, the amount of the crosslinker used, and the limitation on the admixing of tackifier resins. The precision adjustment can be optimized further through the choice of selected crosslinkers, as illustrated in the context of this specification.

One possible option is for a resin to be admixed to the PSA. It has emerged, however, that excessive resin admixtures (in the present case, more than 13% by weight) cause the falling ball test to be failed and the PSA, accordingly, to be unsuitable for the required end use (cf. Examples 3, 5, 7, 8, and 12).

A pass in the cleavage test indicates the resistance of the adhesive tapes under investigation and of the bonds produced therewith with respect in particular to low-frequency disruptions. The cleavage test serves in particular to illustrate their suitability for compensating flexural stresses, and also a good temperature cohesion stability.

It was found that the cleavage test is passed when the ratio $V=n_Z/n_P$ of the amount-of-substance $n_Z$ of the crosslinking-active centers of the crosslinker to the theoretical amount-of-substance $n_P$ of the macromolecules of the polymer component A1 is selected within a defined range, as indicated in the main claim (see Examples 1, 2, 3, 7, 10, 11, and 12). The degree of crosslinking achieved by this amount of crosslinker can be characterized outstandingly through the loss factor tan 5. For the successful examples, the loss factor is situated within the range mandated in the context of this specification.

The falling ball test is especially suitable for investigating the shock absorbency of the adhesive tape, this being its suitability for accommodating mechanical effects such as drops or shocks. If this test is passed, the relevant suitability is considered to be sufficient.

The experiments showed that the falling ball test was regularly passed when the rolling ball tack test gave a figure of not more than 50 mm. Another characteristic that can be employed is the glass transition frequency $f_g$ at 25° C. The falling ball test was passed by the samples for which the glass transition frequency $f_g$ at 25° C. attains a figure of at least 5000 rad/s (Examples 1, 2, 4, 6, 9, 10, 11, 13, and 14).

The adhesive tapes with the features according to the invention pass the temperature stability test (SAFT test), as do the adhesive tapes with highly crosslinked PSAs. Under-crosslinking of the polyacrylate component (inadequate amount of crosslinker), however, leads to an insufficient temperature stability.

It was found, moreover, that the sample crosslinked with an aluminum chelate crosslinker (Example 16), while passing the falling ball test, does not pass the cleavage test and also does not display good temperature stability (failure in the SAFT test). Accordingly, a PSA crosslinked in this way does not meet the requirements in accordance with the objective. The PSAs produced with the crosslinkers required in accordance with the invention therefore have a distinct advantage over the chelate-crosslinked PSAs.

Consequently it has been possible to show that the claimed adhesive tapes are outstandingly suitable for meeting the objective problem. The polymer composition likewise claimed is outstandingly suitable for producing such adhesive tapes.

TABLE 1

| | Component | | Unit | 1 | 2 | 3 (C) | 4 (C) | 5 (C) | 6 (C) | 7 (C) | 8 (C) |
|---|---|---|---|---|---|---|---|---|---|---|---|
| Acrylic acid | a1 | | wt. %(*) | 5 | 4.55 | 4.17 | 4.76 | 4.17 | 5 | 4.35 | 4.35 |
| Butyl acrylate | b | | wt. %(*) | 47.5 | 43.18 | 39.58 | 45.24 | 39.58 | 47.5 | 41.3 | 41.3 |
| Ethylhexyl acrylate | b | | wt. %(*) | 47.5 | 43.18 | 39.58 | 45.24 | 39.58 | 47.5 | 41.3 | 41.3 |
| Resin (terpene-phenolic) | | A2 | wt. %(*) | 0 | 9.09 | 16.67 | 4.76 | 16.67 | 0 | 13.05 | 13.05 |
| Crosslinker | | B | | 0.05 () | 0.05 () | 0.05 () | 0.075 () | 0.1 () | 0.1 () | 0.05 () | 0.075 () |
| Crosslinker ratio V | | | Parts by weight | 0.39 | 0.58 | 0.46 | 0.8 | 0.87 | 1.07 | 0.51 | 0.69 |
| Number-average molecular weight $M_n$ | | | kg/mol | 80 | 120 | 95 | 110 | 90 | 110 | 105 | 95 |
| Falling ball test (***) | | | | yes | yes | no | yes | no | yes | no | no |
| RBT | | | mm | 34 | 49 | 87 | 37 | 79 | 34 | 60 | 63 |
| $f_g$ at 25° C. (DMA) | | | rad/s | 7630 | 6020 | 2071 | 8709 | 2336 | 13 280 | 3852 | 3713 |
| $T_g$ at 10 rad/s (DMA) | | | ° C. | −26 | −18 | −8 | −22 | −7 | −26 | −10 | −10 |
| SAFT (***) | | | | yes | yes | yes | yes | yes | yes | yes | yes |
| Cleavage (***) | | | | yes | yes | yes | no | no | no | yes | no |
| tan δ (0.1 rad, 85° C.) | | | | 0.41 | 0.43 | 0.45 | 0.28 | 0.23 | 0.22 | 0.44 | 0.29 |

| | Component | | Unit | 9 (C) | 10 | 11 | 12 (C) | 13 (C) | 14 (C) | 15 (C) | 16 (C) |
|---|---|---|---|---|---|---|---|---|---|---|---|
| Acrylic acid | a1 | | wt. %(*) | 5 | 5 | 4.55 | 4.17 | 5 | 4.55 | 4.17 | 4.55 |
| Butyl acrylate | b | | wt. %(*) | 47.5 | 47.5 | 43.18 | 39.58 | 47.5 | 43.18 | 39.58 | 43.18 |
| Ethylhexyl acrylate | b | | wt. %(*) | 47.5 | 47.5 | 43.18 | 39.58 | 47.5 | 43.18 | 39.58 | 43.18 |
| Resin (terpene-phenolic) | | A2 | wt. %(*) | 0 | 0 | 9.09 | 16.67 | 0 | 9.09 | 16.67 | 9.09 |
| Crosslinker | | B | | 0.075 () | 0.25 () | 0.25 () | 0.25 () | 0.01 () | 0.01 () | 0.01 () | 0.05 (*) |
| Crosslinker ratio V | | | Parts by weight | 0.66 | 0.23 | 0.24 | 0.22 | 0.09 | 0.1 | 0.1 | 0.46 |
| Number-average molecular weight $M_n$ | | | kg/mol | 90 | 95 | 100 | 90 | 95 | 100 | 105 | 100 |
| Falling ball test (***) | | | | yes | yes | yes | no | yes | yes | no | yes |
| RBT | | | mm | 32 | 31 | 47 | 69 | 34 | 45 | 64 | 45 |
| $f_g$ at 25° C. (DMA) | | | rad/s | 13 770 | 14 105 | 5780 | 3101 | 8114 | 5912 | 3759 | 5645 |
| $T_g$ at 10 rad/s (DMA) | | | ° C. | −26 | −26 | −17 | −8 | −27 | −19 | −9 | −17 |
| SAFT (***) | | | | yes | yes | yes | yes | no (150° C.) | no (140° C.) | no (130° C.) | no (100° C.) |
| Cleavage (***) | | | | no | yes | yes | yes | no | no | no | no |
| tan δ (0.1 rad, 85° C.) | | | | 0.27 | 0.59 | 0.59 | 0.59 | 0.81 | 0.93 | 1.07 | 1.18 |

(*)based on polymer composition (components a1, b, and A2)
(**) tetraglycidyl-meta-xylenediamine; based without dilution on 100 parts by weight of polyacrylate component A1 (components a1, b)
(***) yes = pass; no = fail
(C) comparative example

The invention claimed is:

1. A double-sided adhesive tape comprising a carrier layer and two outer layers of pressure-sensitive adhesive (PSA),
wherein at least one of the PSAs is the crosslinking product of a polymer composition which comprises at least the following components:
A) a polymer component (component A) comprising 88 to 100 wt. % of one or more polyacrylates (component A1) composed of at least:
 a) 1 to 15 wt. %, based on component A1, of one or more monomers having at least one ethylenically unsaturated bond, which are each selected such that the glass transition temperatures $T_g$ of the corresponding homopolymers of the respective monomer are at least 0° C. (monomers a), and at least some of the monomers (a) also have at least one carboxylic acid group (monomers a1),
 b) 85 to 99 wt. %, based on component A1, of one or more monomers from the group of acrylic esters and methacrylic esters, which are each selected such that the glass transition temperatures $T_g$ of the corresponding homopolymers of the respective monomer are not more than −30° C. (monomers b),
B) at least one covalently crosslinking di- or polyfunctional crosslinker (component B),
where components A and B account in total for at least 95 wt. % of the polymer composition, wherein the at least one crosslinker is present in an amount such that the ratio $V=n_Z/n_P$ of the amount-of-substance $n_Z$ of the crosslinking-active centers of the crosslinker to the theoretical amount-of-substance $n_P$ of the macromolecules of the polymer component A1 possesses a value of between 0.15 and 0.60, where the amount-of-substance $n_Z$ of the crosslinking-active centers of the crosslinker is given by the mass $m_V$ of the crosslinker, multiplied by the number f of the crosslinking-active centers per crosslinker molecule, divided by the molar mass $M_V$ of the crosslinker, in other words $n_Z=f \cdot m_V/M_V$, and the theoretical amount-of-substance $n_P$ of the macromolecules of the polymer component A1 is given by the mass $m_P$ of the polymer component in the PSA, divided by the number-average molar mass $M_{n,P}$ of this component, in other words $n_P=m_P/M_{n,P}$.

2. The adhesive tape of claim 1, wherein the loss factor tan δ (ratio between loss modulus G″ and storage modulus G′) of the PSA at 0.1 rad/s and 85° C., measured by means of DMA, is in a range from 0.35 to 0.75, and the glass transition frequency $f_g$ at 25° C., determined by DMA measurement, is more than 5000 rad/s.

3. The adhesive tape of claim 1 wherein the monomers a1 are present at 3 to 5 wt. %, based on component A1.

4. The adhesive tape of claim 1 wherein the crosslinker is a covalently reacting crosslinker.

5. The adhesive tape of claim 1 wherein the proportion $V=n_Z/n_P$ of the amount-of-substance $n_Z$ of the crosslinking-active centers of the crosslinker to the theoretical amount-of-substance $n_P$ of the macromolecules of the polymer component A1 possesses a value of between 0.38 and 0.59.

6. The adhesive tape of claim 1 wherein the tape has a thickness of 100 to 300 μm.

7. The adhesive tape of claim 1 wherein the layers of pressure-sensitive adhesive on both sides of the carrier layer are geometrically identical.

8. The adhesive tape of claim 1 wherein the pressure-sensitive adhesives on both sides of the carrier layer are chemically identical.

9. The adhesive of claim 1 wherein at least some of the monomers are selected from the group comprising methyl acrylate, ethyl acrylate, methyl methacrylate, and ethyl methacrylate (monomers a2).

10. The adhesive tape of claim 9, wherein the monomers a2 are present at up to 10 wt. %, based on component A1.

11. The adhesive tape of claim 1 wherein the polymer component A further comprises up to 12, of a resin component (component A2) having a softening point of 80 to 150° C.

12. The adhesive tape of claim 11 wherein the crosslinker comprises amine functions in the molecule.

13. The adhesive tape of claim 12 wherein the crosslinker istetraglycidyl-meta-xylenediamine.

14. A polymer composition for producing a crosslinked pressure-sensitive adhesive comprising at least the following components:
A) a polymer component (component A) comprising 88 to 100 wt. % of one or more polyacrylates (component A1) composed of at least:
 a) 1 to 15 wt. %, based on component A1, of one or more monomers having at least one ethylenically unsaturated bond, which are each selected such that the glass transition temperatures $T_g$ of the corresponding homopolymers of the respective monomer are at least 0° C. (monomers a), and at least some of the monomers (a) also have at least one carboxylic acid group (monomers a1),
 b) 85 to 99 wt. %, based on component A1, of one or more monomers from the group of acrylic esters and methacrylic esters, which are each selected such that the glass transition temperatures $T_g$ of the corresponding homopolymers of the respective monomer are not more than −30° C. (monomers b),
B) at least one di- or polyfunctional crosslinker (component B), where the at least one crosslinker is present in an amount such that the ratio $V=n_Z/n_P$ of the amount-of-substance $n_Z$ of the crosslinking-active centers of the crosslinker to the theoretical amount-of-substance $n_P$ of the macromolecules of the polymer component A1 possesses a value of between 0.15 and 0.6,
 where the amount-of-substance $n_Z$ of the crosslinking-active centers of the crosslinker is given by the mass my of the crosslinker, multiplied by the number f of the crosslinking-active centers per crosslinker molecule, divided by the molar mass My of the crosslinker, in other words $n_Z=f \cdot m_V/M_V$,
 and the theoretical amount-of-substance $n_P$ of the macromolecules of the polymer component A1 is given by the mass $m_P$ of the polymer component in the PSA, divided by the number-average molar mass $M_{n,P}$ of this component, in other words $n_P=m_P/M_{n,P}$.

* * * * *